INVENTORS
ROBERT E. DIENER
ANDREW A. SPISAK

ATTORNEYS

INVENTORS
ROBERT E DIENER
ANDREW A. SPISAK
BY

ATTORNEYS

United States Patent Office 3,436,994
Patented Apr. 8, 1969

3,436,994
MACHINE TOOL
Robert E. Diener, Shaker Heights, and Andrew A. Spisak, Cleveland, Ohio, assignors to The Warner & Swasey Company, Cleveland, Ohio, a corporation of Ohio
Filed Jan. 5, 1967, Ser. No. 607,444
Int. Cl. B23b 21/00; F16h 1/20
U.S. Cl. 82—24                                    9 Claims

ABSTRACT OF THE DISCLOSURE

A mechanical brake mechanism prevents a machine tool turret slide, which is mounted in an inclined position, from moving in a downward direction due to its own mass. The mechanical brake mechanism includes a one-way overrunning clutch, which interconnects a driving shaft member for the slide and a brake drum, and brake shoes which engage the brake drum to prevent rotation of the brake drum.

---

The present invention relates to a machine tool, and particularly to a machine tool having a slide member and a drive for effecting movement of the slide transverse to the axis of rotation of the spindle.

Machine tools having cross slide tool carrying turret members which move transverse to the axis of rotation of the spindle are known. The turret slide in a known machine tool is mounted on inclined ways so that the turret, when it moves transverse to the spindle axis, moves in an inclined path. With such an inclined mounting, the turret slide tends to move downward due to its own mass, and in fact, the turret slide does move downward causing damage to various parts of the machine tool when the machine tool is not in operation.

The principal object of the present invention is the provision of a new and improved machine tool having a slide member mounted in a position such that its own mass tends to rotate the drive thereto which would result in downward movement of the slide, and wherein a mechanical brake mechanism is provided for the drive to prevent any downward movement of the slide due to its own weight.

A further object of the present invention is the provision of a new and improved machine tool having a slide member mounted in an inclined position, such that its own weight tends to effect rotation of the drive for moving the slide in a downward direction, and wherein the drive to the cross slide is effected by an electric motor and the cross slide is positioned by the use of an electric brake mechanism and wherein the machine tool includes a mechanical brake for braking the drive and preventing lowering movement of the slide due to its own weight when the machine tool is not in operation or the electric brake mechanism is inoperative.

A still further object of the present invention is the provision of a new and improved machine tool, as noted in the next preceding paragraph, wherein the mechanical brake mechanism comprises a one-way overrunning clutch which cooperates with a shaft which is rotatable in one direction to raise the slide and which freely permits raising of the slide and which also cooperates with a brake drum and locks the shaft to the brake drum when the shaft rotates in a direction to effect lowering movement of the slide whereby lowering movement of the slide is effected by overcoming the action of the brake mechanism.

A further object of the present invention is the provision of a new and improved machine tool, as noted in the next preceding paragraph, wherein a pair of brake shoes are spring biased into engagement with the brake drum to apply a braking pressure to the brake drum at all times, and which permits rotation of the brake drum by the electric motor when it is desired to move the slide in a downward direction.

Another object of the present invention is the provision of a new and improved brake mechanism for use in braking a rotating shaft which is rotatable in opposite directions and which comprises an overrunning clutch mechanism cooperable with the shaft and with a brake drum and which permits rotation of the shaft relative to the brake drum in one direction but which is operable to connect the brake drum and shaft to prevent rotation of the shaft relative to the brake drum in the opposite direction, and wherein brake shoes cooperate with the brake drum to apply a force to the brake drum resisting rotation of the brake drum with the shaft.

Further objects and advantages of the present invention will be apparent to those skilled in the art to which it relates from the following detailed description of a preferred embodiment thereof made with reference to the accompanying drawings forming a part of the specification and in which.

The present invention provides an improved machine tool having a slide which is mounted in a position where the weight of the slide tends to cause the slide to move downward. For purposes of illustration and as representative of the present invention, the present invention is shown embodied in a machine tool 10, illustrated in FIG. 1. The machine tool 10 comprises a rotatable spindle 11 which is adapted to carry a workpiece and effect rotation of the workpiece. The workpiece, of course, is worked upon by tools carried on a cross slide 12 and on a cross-sliding pentagon turret 13. The turret 13 and the cross slide 12 are movable in a direction transverse to the axis of rotation of the spindle 11 to properly position the tools carried thereby to work on the workpiece and are also movable in a direction parallel to the axis of rotation of the spindle.

Figure 1:
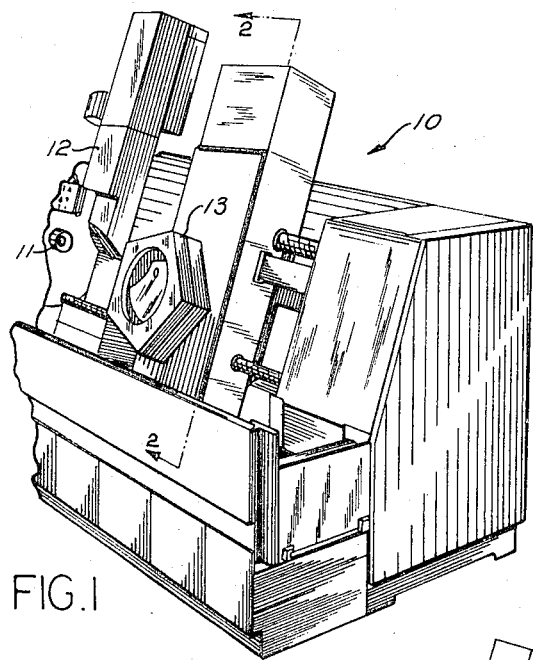
FIG. 1 is a schematic, partial perspective view of a machine tool embodying the present invention.
Figure 2:
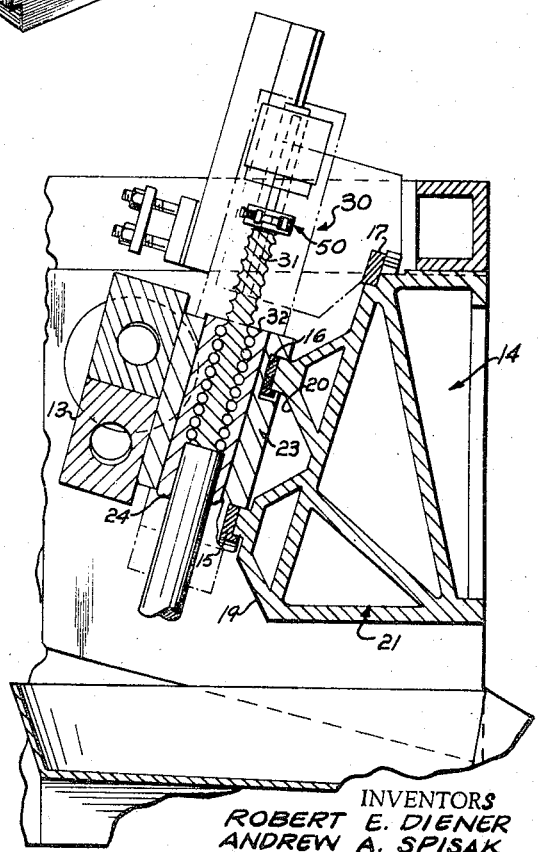
FIG. 2 is a fragmentary sectional view of the machine tool of FIG. 1 taken approximately along the section line 2—2 thereof.

As shown in FIGS. 1 and 2, the turret 13 is supported in an inclined position. The turret is supported in its inclined position due to the specific construction of a support bed 14, best shown in FIG. 2, of the machine tool.

The bed 14 of the machine tool includes inclined, vertically spaced ways 15, 16 and 17. The ways 15, 16 are supported by triangular support structures 19 and 20, respectively, which in turn, are carried by a main triangular support bed 21. The way 17 is positioned at the upper apex of the support bed 14, as shown in FIG. 2. The cross slide 12 is supported for movement parallel to the spindle axis by ways 16 and 17.

The turret slide 13 is supported for movement toward and away from the spindle 11 by the bed construction in a direction parallel to the axis of rotation of the spindle 11. The turret 13, more specifically, is carried on a slide 23 which is supported for movement along the ways 15, 16 in a direction parallel to the axis of spindle rotation. The turret 13 is also supported for movement transverse to the ways 15, 16 in an inclined direction, and specifically is supported on a slide 24 carried by the slide 23 for movement transverse thereto. Any suitable drive mechanism may be utilized for moving the slide 23 along the ways 15, 16.

Figure 3:
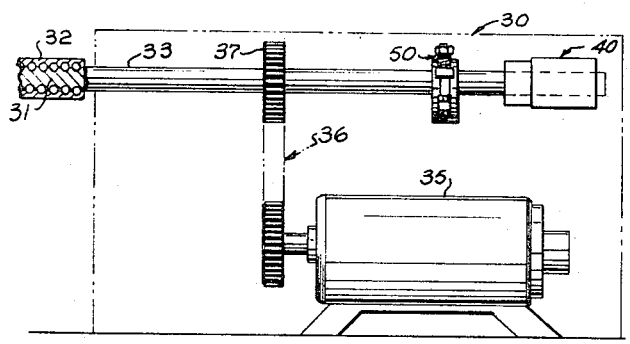
FIG. 3 is a schematic view illustrating a drive train arrangement for a slide member of the machine tool of FIG. 1.

The machine tool 10 includes a drive mechanism for moving the turret 13 in an inclined path transverse to the axis of rotation of the spindle 11. Specifically, a drive mechanism, generally designated 30, see FIG. 3, is provided for effecting movement of the slide 24 relative to the slide 23 in an inclined or vertical direction. The drive mechanism 30 includes a ball-screw arrangement which includes a ball screw 31 and a plurality of balls 32 which cooperate with the ball screw and with the slide 24 to effect movement of the slide 24 in a direction transverse to the spindle axis upon rotation of the ball screw 31. The ball screw 31 is formed as an extension of a shaft 33 and upon rotation of the shaft 33, the ball screw 31 will be rotated and the turret 13 will be moved in a direction transverse ot the axis of rotation of the spindle 11. The direction of movement of the turret 13 will depend upon the direction of rotation of the shaft 33. The shaft 33 may be rotated in opposite directions from a suitable electric motor 35, shown in FIG. 3. The motor 35 is drivingly connected through a suitable drive arrangement, shown schematically and designated 36, with a gear 37 fixed to the shaft 33 to effect rotation of the shaft upon energization of the motor 35. The drive connection 36 may include a suitable transmission arrangement for effecting rotation of the shaft in opposite directions.

During the machining of a workpiece, the slide 24, of course, is moved in an inclined or vertical direction and may be raised or lowered. The turret may be stopped accurately and in a position to effect the machining of the workpiece as desired. Accurate positioning of the slide 24 in the desired vertical position is effected during operation of the machine tool 10 by an electrically energizable magnetic brake assembly 40, of known construction and schematically shown in FIG. 3. The magnetic brake assembly 40 is energized to effect stopping of the shaft 33 so as to provide accurate positioning of the turret 13 during the machining operation of the workpiece. Of course, when there is no power being delivered to the machine, as when the machine is turned off for the night, the magnetic brake assembly 40 is no longer operable and applies no braking force to the shaft 33. In such a condition, the shaft 33 has no braking force applied thereto by the magnetic brake and tends to be rotated due to the mass of the turret 13 and slide 24, and unless prevented, the shaft 33 would be rotated due to the mass of the turret 13 and slide 24, and the turret and slide would move in a downward direction in, what might be termed, "free fall," and cause damage to machine parts.

In accordance with the present invention, a brake mechanism 50 is provided for preventing rotation of the shaft 33 when the magnetic brake 40 is not energized in such situations as when the machine is turned off for the night, or when no power is being delivered to the machine. The brake mechanism 50 prevents the mass of the turret 13 and slide 24 from rotating the shaft 33, and thus the brake mechanism 50 is effective to hold the turret 13 in the position that it occupied when the power to the machine was turned off. Thus, the brake mechanism 50 is operable ot prevent lowering movement of the turret 13 and slide 24 due to their mass.

Figure 4:
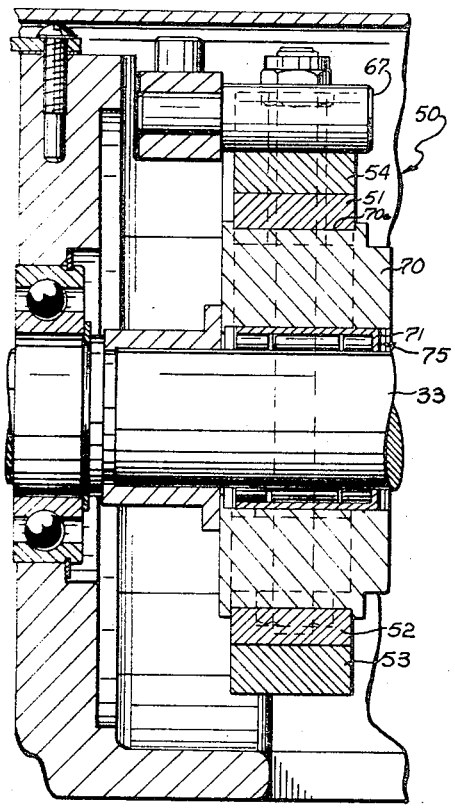
FIG. 4 is a cross-sectional view of a brake mechanism utilized in the machine tool of FIG. 1 and taken approximately along the section line 4—4 of FIG. 5.
Figure 5:
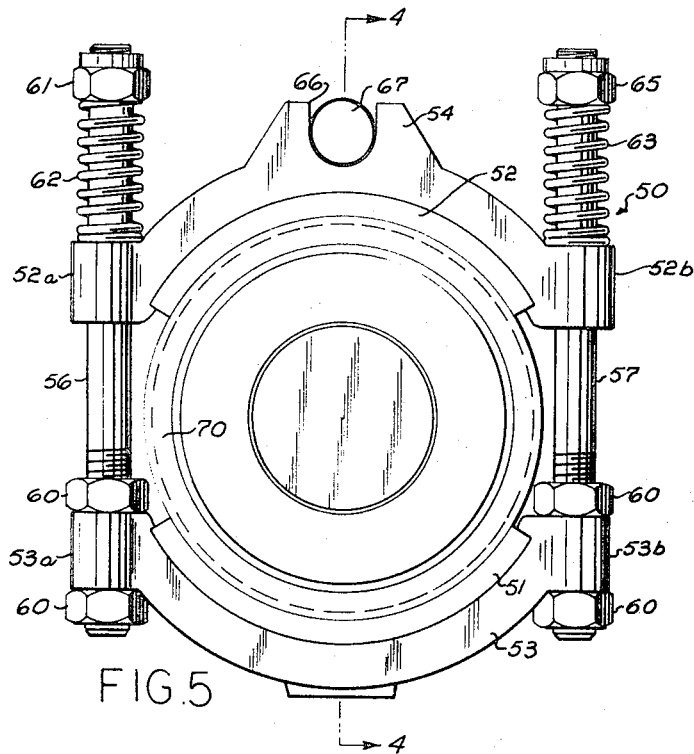
FIG. 5 is an end elevational view of the brake mechanism shown in FIG. 4, looking at the brake mechanism of FIG. 4 from the right.

The brake mechanism 50 is best shown in FIGS. 4 and 5. The brake mechanism 50 includes a pair of brake shoes 51, 52. The brake shoe 51 is carried by a yoke member 53, while the brake shoe 52 is carried by a yoke member 54. The yoke members 53, 54 are interconnected at their opposite sides by rod members 56, 57 which extend through openings formed in boss portions 52a, 52b and 53a, 53b of the yoke members 53, 54, respectively. Suitable nuts 60 are threaded on the rod members 56, 57 to effect adjustment of the yoke member 53 with respect to the rod members 56, 57.

A nut 61 is positioned at the outer end of the rod 56, as shown in FIG. 5, and a spring 62 acts against the nut 61 and against the boss portion 52a of the yoke 54. The spring 62 biases the nut 61 and boss 52a in opposite directions, thus applying a force tending to pull the yokes 53, 54 together. A spring 63 similar to the spring 62 encircles the upper end of the rod 57 and cooperates with a nut 65 on the outer end of the rod 57 and the boss portion 52b of the yoke 54. The spring 63 also applies a biasing force tending to urge the yoke 53 and the yoke 54 toward each other.

The yoke member 54 has a slot 66 in the outer end thereof and a pin 67 is positioned in the slot 66. The pin 67 is fixedly secured to the frame of the machine 10 and in this manner the yoke 54 is prevented from rotation, which likewise prevents rotation of the yoke 53.

The brake shoes 51, 52 carried by the yokes 53, 54, respectively, cooperate with a brake drum 70 and specifically are engaged with the outer peripheral surface 70a of the brake drum 70. The two springs 62, 63 acting on the yokes at spaced locations maintain the surface area of the brake shoes 51, 52 in engagement with the drum surface 70a and in a "centered" relation for effective braking.

The brake drum 70 has a central bore 71 therethrough through which the shaft 33 extends. A one-way overrunning clutch mechanism 75 encircles the shaft 33 and cooperates therewith and with the drum 70 to drivingly connect the shaft 33 with the drum 70 in one direction of rotation of the shaft 33, but permits rotation of the shaft 33 in the opposite direction relative to the drum 70.

The one-way overruning clutch mechanism 75 includes a sleeve member 80 which is press-fit into the bore 71 of the brake drum 70 and is fixed for rotation with the brake drum 70. The clutch assembly 75 also includes a cage 81 which carries a plurality of roller members 82. The roller members 82 are movable with the cage and have peripheral surface portions adapted to engage the shaft 33 and the sleeve member 80. The sleeve member 80 is provided with a plurality of recesses 84 therein which cooperate with the rollers. The recesses 84 are defined by tapered surface portions and the recesses 84 become less in depth as they extend in the direction of rotation of the shaft 33 when it is rotating to move the slide 24 in a downward direction. The construction and operation of the overrunning clutch and its cooperation with the shaft 33 will be better appreciated from the description hereinbelow and with reference to FIGS. 6 and 7.

Figure 7:
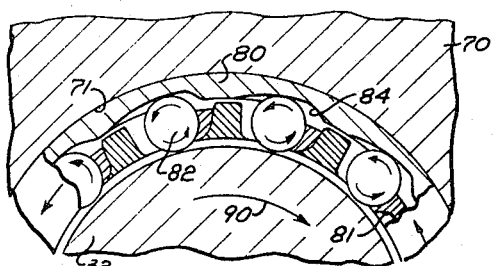

Referring now to FIG. 7, when it is desied to move the turrent 13 and slide 24 in an upward direction, as shown in the drawings, the shaft 33 is rotated in the direction of the arrow 90. When the shaft 33 is rotated in the direction of the arrow 90, the rollers 82 and cage 81 are moved or tend to move in a corresponding circumferential direction relative to the surfaces defining the recesses 84. The rollers actually move or take a position wherein they do not wedgingly engage the surfaces defining recesses 84. Thus, the shaft 33 and brake drum 70 are not drivingly connected and the shaft 33 is free to rotate relative to the brake drum 70.

Figure 6:
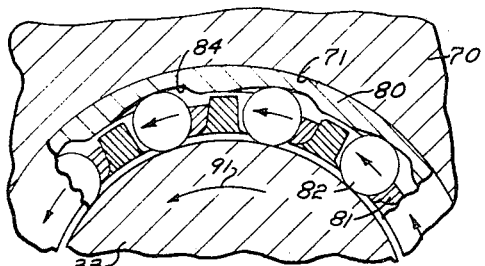
FIGS. 6 and 7 are enlarged views illustrating a part of the brake mechanism shown in FIGS. 4 and 5 in different operative conditions.

However, if the shaft 33 is rotated in the direction of the arrow 91, as shown in FIG. 6, the rollers 82 tend to move in the direction of the arrows indicated in FIG. 6 and in a direction into the wedge defined by the tapering surface defining the recesses 84, on the one hand, and the peripheral surface of the shaft 33, on the other hand. The rollers actually wedge between the outer peripheral surface of the shaft 33 and the surface defining the recesses 84. In this direction of rotation of the shaft 33, the rollers drivingly connect the shaft 33 and the sleeve 80. Thus, the one-way overrunning clutch mechanism 75 is effective to drivingly connect the shaft 33 with the brake drum 70 when the shaft 33 rotates in the direction of the arrow 91, which is the direction in which the shaft 33 is rotated to effect downward movement of the turret 13. When the turret 13 is to be rotated and moved in a downward direction, the shaft 33, of course, is rotated in the direction of the arrow 91 and there must be sufficient force applied to the shaft 33 in order to permit slipping of the brake drum 70 relative to the brake shoes 51, 52.

The springs 62 and 63 may be adjusted by the nuts 61 and 65, respectively, to maintain a desired force between the brake shoes 51, 52 and the brake drum 70 sufficient to hold the turret 13 stationary. The desired force, of course, is dependent upon the mass being held by the brake mechanism 30, which will vary in accordance with the type of turret 13 and the several available types of tools, not shown, which may be mounted on the turret 13. Furthermore, since the forces of the drive mechanism 30 must overcome this braking force before the turret 13 will move, the desired force should not be set too high, or excessive brake shoe wear will be experienced during those intervals when the turret 13 is being lowered.

In the event the power is turned off the machine, as described hereinabove, the mass of the turret 13 and slide 24 tends to cause the turret 13 to move in a downward direction. This tends to effect rotation of the shaft 33 in the direction of the arrow 91 in FIG. 6. Of course, as described hereinabove, when the shaft 33 tends to rotate in the direction of the arrow 91, the rollers 82 of the overrunning clutch mechanism 75 wedgingly engage the surface defining the recesses 84 and the periphery of the shaft 33, and thereby drivingly connect the shaft 33 and the brake drum 70. Thus, when the weight of the turret 13 acts on the shaft 33 tending to effect rotation thereof in the direction of the arrow 91, the shaft 33 is drivingly connected through the one-way overrunning clutch 75 to the brake drum 70. In this instance, the brake shoes 51, 52 apply sufficient force to the brake drum 70 to prevent rotation of the brake drum 70 due to the action of the mass of the turret 13 and slide 24. Thus, the shaft 33 cannot rotate and thus the brake mechanism 50 is effective to prevent the turret 13 from moving in a downward direction, even though power to the machine is turned off. Consequently, all the problems which are caused as a result of the turret moving in a downward direction due to its own mass are eliminated by the present construction.

The brake may be used in association with any slides mounted in a manner where the mass of the slide tends to rotate the drive to the slide and cause lowering movement thereof and may be used in association with the cross slide 12.

It should be further apparent from the description hereinabove that applicants have provided a new and improved machine tool and that certain modifications, changes, and adaptations may be made therein by those skilled in the art to which it relates, and it is hereby intended to cover all such modifications, changes, and adaptations coming within the scope of the appended claims.

What is claimed is:

1. In a machine tool having a tool-carrying slide member, means supporting said slide member in an inclined position and for movement in an inclined path, a drive for moving said slide member in said inclined path, said drive including a shaft rotatable in first and second directions to effect raising and lowering movement of the slide, respectively, and a drive connection between said shaft and said slide, said drive connection tending to rotate said shaft in said second direction due to the mass of said slide, the improvement comprising a mechanical brake mechanism for holding said shaft from rotation in said second direction due to said mass and thereby preventing lowering movement of said slide due to said mass.

2. A machine tool as defined in claim 1 wherein said machine tool includes an electric motor for rotating said shaft to effect raising and lowering movement of said slide and a magnetic brake mechanism for effecting braking of said shaft to properly position said slide.

3. A machine tool as defined in claim 1 wherein said mechanical brake mechanism comprises a brake drum, a one-way overrunning clutch cooperating with the brake drum and said shaft, and brake means applying a braking force to said brake drum to prevent rotation of said brake drum, said one-way overrunning clutch including members which permit rotation of said shaft in said first direction relative to said brake drum and which operate to drivingly connect said brake drum and said shaft to prevent rotation of said shaft relative to said brake drum in said second direction.

4. A machine tool as defined in claim 1 further including a rotatable spindle and wherein said slide member comprises a turret slide carrying an indexible tool-carrying turret, and means supporting said slide for movement in a direction parallel to the axis of rotation of said spindle.

5. In a machine tool having a tool-carrying slide member, a drive for moving said slide member, means supporting said slide in an inclined position, said drive including a shaft rotatable in first and second directions to effect raising and lowering movement of the slide respectively, an electric motor drivingly connected with the shaft to effect rotation of said shaft in said first and second directions, a magnetic brake opeartively associated with said shaft and energizable to provide for braking of the shaft and thereby permit accurate positioning of said slide, and a drive connection between said shaft and slide tending to rotate said shaft in said second direction due to the weight of said slide, the improvement comprising a brake mechanism for holding said shaft from rotation in said one direction due to said weight when said magnetic brake is de-energized.

6. A machine tool as defined in claim 5 wherein said brake mechanism comprises a brake drum, and a one-way over-running clutch mechanism permitting rotation of said shaft relative to said brake drum when said shaft rotates in said first direction to raise said slide and which drivingly connects said shaft and said brake drum when said shaft rotates in said second direction to lower said slide, and wherein said brake drum is rotated upon rotation of said shaft to effect movement of the slide in a downward direction upon energization of said electric motor.

7. A machine tool as defined in claim 6 wherein said overrunning clutch includes a plurality of drive transmitting members which drivingly connect said brake drum and said shaft.

8. A machine tool as defined in claim 6 wherein said brake mechanism further includes plural brake shoes in pressure engagement with said brake drum, yoke members carrying said brake shoes, and spring means acting on said yoke members and urging said brake shoes into said pressure engagement.

9. In a machine tool having a tool-carrying slide member, means supporting said slide member for raising and lowering movement, a drive connected with said slide member and operable to effect said movement thereof, said drive including a shaft rotatable in first and second directions to effect raising and lowering movement of the slide, respectively, and a drive connection between said shaft and said slide, said drive connection tending to rotate said shaft in said second direction due to the mass of said slide, the improvement comprising a mechanical brake mechanism for holding said shaft from rotation in said second direction due to said mass and thereby preventing lowering movement of said slide due to said mass.

References Cited

UNITED STATES PATENTS 2,564,180   8/1951   Turrettini _____ 74—424.8
3,244,037   4/1966   Ruehmer _____ 82—2

LEONIDAS VLACHOS, *Primary Examiner.*

U.S. Cl. X.R.

29—39; 74—424.8; 77—36; 188—82.84